US012629757B2

(12) United States Patent
Zettler et al.

(10) Patent No.: US 12,629,757 B2
(45) Date of Patent: May 19, 2026

(54) CUTTING TOOL PART HAVING AN ADDITIVELY MANUFACTURED CUTTING PORTION WITH INTEGRALLY FORMED GUIDE PADS AND METHOD OF MANUFACTURING SAME

(71) Applicant: ISCAR, LTD., Tefen (IL)

(72) Inventors: Martin Ulrich Zettler,
Vaihingen-Horrheim (DE); Nikolaos Poussios, Vaihingen-Horrheim (DE);
Henner Michael Dziubas,
Vaihingen-Horrheim (DE)

(73) Assignee: Iscar, Ltd., Tefen (IL)

( * ) Notice: Subject to any disclaimer, the term of this patent is extended or adjusted under 35 U.S.C. 154(b) by 925 days.

(21) Appl. No.: 17/878,334

(22) Filed: Aug. 1, 2022

(65) Prior Publication Data

US 2023/0182215 A1     Jun. 15, 2023

Related U.S. Application Data

(60) Provisional application No. 63/288,672, filed on Dec. 13, 2021.

(51) Int. Cl.
| | |
|---|---|
| *B23B 51/00* | (2006.01) |
| *B33Y 80/00* | (2015.01) |
(Continued)

(52) U.S. Cl.
CPC .......... *B23B 51/0003* (2022.01); *B33Y 80/00* (2014.12); *B23B 51/06* (2013.01);
(Continued)

(58) Field of Classification Search
CPC . B23B 51/0003; B23B 51/06; B23B 2251/56; B23D 77/00; B23D 2277/46; B23C 2210/56
See application file for complete search history.

(56) References Cited

U.S. PATENT DOCUMENTS

| | | | |
|---|---|---|---|
| 3,237,488 A | * | 3/1966 | Parone ................... B23B 51/02 |
| | | | 408/230 |
| 3,244,035 A | | 4/1966 | Jehle et al. |

(Continued)

FOREIGN PATENT DOCUMENTS

| | | |
|---|---|---|
| CN | 105522200 A | 4/2016 |
| DE | 921125 | 12/1954 |

(Continued)

OTHER PUBLICATIONS

International Search Report dated Mar. 7, 2023, issued in PCT counterpart application No. PCT/IL2022/051211.
(Continued)

*Primary Examiner* — Eric A. Gates
(74) *Attorney, Agent, or Firm* — Womble Bond Dickinson (US) LLP

(57) ABSTRACT

A cutting tool part includes a cutting portion. The cutting tool part further includes a plurality of guide pads projecting radially outwards from the cutting portion. At least the cutting portion and the plurality of guide pads are made through additive manufacturing, the plurality of guide pads being integrally formed with the cutting portion in a unitary one-piece construction. A rotary cutting tool is provided having a cutting insert releasably attached to the cutting tool part.

36 Claims, 4 Drawing Sheets

(51) Int. Cl.
|  |  |
|---|---|
| *B23B 51/06* | (2006.01) |
| *B23D 77/00* | (2006.01) |

(52) U.S. Cl.
CPC .......... *B23B 2251/56* (2013.01); *B23D 77/00* (2013.01); *B23D 2277/46* (2013.01)

(56) References Cited

U.S. PATENT DOCUMENTS

| | | | |
|---|---|---|---|
| 5,238,335 A | 8/1993 | Nomura | |
| 5,967,707 A | 10/1999 | Larson | |
| 6,540,452 B1 | 4/2003 | Bolkart et al. | |
| 7,338,237 B2 * | 3/2008 | Frejd ...................... | B23B 51/06 |
| | | | 408/230 |
| 7,896,588 B2 | 3/2011 | Ananolli | |
| 8,317,439 B2 | 11/2012 | Drori et al. | |
| 8,770,896 B2 * | 7/2014 | Nisikawa ............... | B23D 77/00 |
| | | | 408/199 |
| 9,358,620 B2 * | 6/2016 | Wenzelburger ..... | B23B 51/0486 |
| 9,421,621 B2 * | 8/2016 | Wenzelburger ......... | B23B 51/04 |
| 9,999,959 B2 * | 6/2018 | Evans .................... | B24B 51/00 |
| 10,201,861 B2 | 2/2019 | Hecht et al. | |
| 10,486,253 B2 | 11/2019 | Ning | |
| 2006/0159532 A1 | 7/2006 | Heilmann et al. | |
| 2010/0040425 A1 | 2/2010 | Nomura et al. | |
| 2010/0061817 A1 * | 3/2010 | Nomura .............. | B23B 51/0493 |
| | | | 408/83 |
| 2011/0008116 A1 | 1/2011 | Nomura | |

| | | | |
|---|---|---|---|
| 2020/0254533 A1 * | 8/2020 | Wenzelburger ..... | B23B 51/0486 |
| 2020/0376570 A1 | 12/2020 | Walcher et al. | |
| 2021/0245268 A1 * | 8/2021 | Schur ................. | B23B 51/0486 |

FOREIGN PATENT DOCUMENTS

| | | | | |
|---|---|---|---|---|
| DE | 19746462 | | 4/1999 | |
| DE | 20316884 U1 * | | 3/2004 | ......... B23B 51/0486 |
| DE | 10351327 B4 * | | 6/2011 | ........... B23B 1/0486 |
| DE | 10 2014208130 | | 11/2015 | |
| DE | 102014208130 A1 | | 11/2015 | |
| EP | 1611982 A1 * | | 1/2006 | .............. B23P 15/46 |
| EP | 3501714 A1 * | | 6/2019 | ............. B28D 1/041 |
| EP | 4056304 A1 * | | 9/2022 | ............. B23B 51/08 |
| JP | 58040209 A * | | 3/1983 | |
| KR | 20100075978 A * | | 7/2010 | ............. B23B 51/04 |
| RU | 2 686 757 C1 | | 4/2019 | |
| WO | WO-2020114575 A1 * | | 6/2020 | ............. B23D 77/02 |

OTHER PUBLICATIONS

Written Opinion dated Mar. 7, 2023, issued in PCT counterpart application No. PCT/IL2022/051211.

Office Action issued Dec. 31, 2025 in Tiwanese patent application No. 111128981.

Search Report issued Mar. 24, 2026 in Russian Application No. 2024119123.

* cited by examiner

CUTTING TOOL PART HAVING AN ADDITIVELY MANUFACTURED CUTTING PORTION WITH INTEGRALLY FORMED GUIDE PADS AND METHOD OF MANUFACTURING SAME

RELATED APPLICATIONS

The present application claims priority to U.S. Provisional Patent Application No. 63/288,672 filed 2021 Dec. 13. The contents of the aforementioned application are incorporated by reference in their entirety.

FIELD OF THE INVENTION

The subject matter of the present application relates to rotary cutting tool parts, in general, and to such cutting tool parts which have a plurality of guide pads in order to guide the cutting tool part when performing rotary metal cutting operations, in particular, and to such plurality of guide pads which are integrally formed having one-piece construction with the cutting tool part, further in particular.

BACKGROUND OF THE INVENTION

As is known in the field of metal cutting, rotary cutting tools can be provided with guide pads, in order to guide the cutting tool when performing rotary metal cutting operations in a hole.

Some such rotary cutting tools include an insert holder and a cutting insert releasably attached to the insert holder. In some such cutting tools the guide pads are integrally formed. US 2010/040425 and US 2011/008116 disclose guide pads fixedly retained in recessed pad pockets on the insert holder by a brazing technique. Other such insert holders do not require pad pockets (of the type described above) since the guide pads are integrally formed on the cutting inset itself. See, for example, U.S. Pat. No. 8,317,439.

Alternatively, the guide pads can be releasably retained in recessed pad pockets on the insert holder, by a fastening member. Examples of such rotary cutting tools are disclosed in U.S. Pat. Nos. 7,896,588 and 10,201,861, showing guide pads which are releasably retained in pad pockets by a retaining screw.

Some other rotary cutting tools have a monolithic construction (with a cutting edge integrally formed with the cutting tool) and also with the guide pads integrally formed with the cutting tool. An example of such a rotary cutting tool is disclosed in US 2020/376570.

It is an object of the subject matter of the present application to provide a cutting tool part having improved guide pads.

It is yet another object of the subject matter of the present application to provide a method of manufacture of a cutting tool part which requires no post manufacture assembly for attaching the guide pads to the cutting tool part.

SUMMARY OF THE INVENTION

In accordance with a first aspect of the subject matter of the present application there is provided a cutting tool part, configured for rotation about a tool part longitudinal axis defining opposite forward and rearward directions, and opposite rotational preceding and succeeding directions with the preceding direction being the cutting direction, the cutting tool part comprising:

a tool part forward end surface, a tool part rearward end surface and a tool part peripheral surface extending therebetween, the tool part peripheral surface extending about the tool part longitudinal axis;

an additively manufactured cutting portion comprising a cutting portion material and located at a forward end of the cutting tool part, the cutting portion comprising a cutting portion peripheral surface formed from the tool part peripheral surface;

a shank portion extending rearwardly from the cutting portion; and a plurality of additively manufactured guide pads comprising a guide pad material and projecting from the cutting portion peripheral surface; wherein:

the plurality of guide pads are integrally formed with the cutting portion in a unitary one-piece construction.

In accordance with a second aspect of the subject matter of the present application there is provided a rotary cutting tool comprising:

a cutting tool part of the type described above; and a cutting insert, having a cutting edge, releasably retained in the insert pocket.

The cutting insert may be a self-clamping cutting insert which is devoid of a through bore configured to receive a clamping screw for retaining the cutting insert in an insert pocket.

In accordance with a third aspect of the subject matter of the present application there is provided a method of manufacturing the cutting tool part of the type described above, comprising the steps of:

manufacturing, by using a first additive manufacturing process, the cutting portion; and manufacturing, by using a second additive manufacturing process, the plurality of guide pads, during or after the step of manufacturing the cutting portion.

It is understood that the above-said is a summary, and that features described hereinafter may be applicable in any combination to the subject matter of the present application, for example, any of the following features may be applicable to the cutting tool part and/or the cutting tool and/or the method of manufacture of the cutting tool part:

The cutting portion material and the guide pad material can be the same.

The cutting portion material and the guide pad material can be different.

The cutting portion material and/or the guide pad material may not be cemented carbide or cermet.

The guide pad material can be steel.

The shank portion may be an additively manufactured shank portion.

The cutting tool part can further comprise a coating layer formed on at least the plurality of guide pads.

The coating layer can be a PVD coating layer.

The PVD coating layer can be a low temperature PVD coating layer.

The low temperature PVD coating layer can be TiN.

The cutting portion can comprise a plurality of angularly spaced apart flutes recessed in the cutting portion peripheral surface and a plurality of angularly spaced apart lands delimited in the radially outwards direction by the cutting portion peripheral surface, each land extending between an associated rotationally preceding flute and an associated rotationally succeeding flute, the associated rotationally preceding flute being rotationally forward of the associated rotationally succeeding flute. Each land can have a respective guide pad formed thereon. For any given land, the respective guide pad can be spaced apart from the given land's associated rotationally preceding flute.

The respective guide pad can be spaced apart from the given land's associated rotationally succeeding flute.

Each land can have a single respective guide pad formed thereon.

The cutting portion peripheral surface at each land can comprise a land raised surface extending along the associated rotationally preceding flute and a land clearance surface recessed with respect to the land raised surface and extending from the land raised surface to the associated rotationally succeeding flute. The respective guide pad can be formed on the given land's land clearance surface.

The cutting tool part can comprise a plurality of cooling channels, each cooling channel having a channel outlet. Each land can have a respective channel outlet formed thereon, the respective channel outlet being configured to direct coolant to the respective guide pad.

The respective channel outlet can be formed between the respective guide pad and the given land's associated rotationally preceding flute.

The plurality of guide pads can extend helically about the tool part longitudinal axis.

The plurality of flutes can extend helically about the tool part longitudinal axis.

The plurality of guide pads can extend helically about the tool part longitudinal axis in the same sense as the plurality of angularly spaced apart helically-extending flutes.

Each helical guide pad can have a pad helix angle. The pad helix angle can be greater than or equal to 20° and less than or equal to 40°.

Each guide pad can be elongated along a pad longitudinal axis, and can have two opposite pad ends and an elongated pad middle portion extending therebetween.

One pad end can be closer to the shank portion than the other pad end.

Each guide pad can comprise a central radially outward facing pad contact surface, two opposing pad end surfaces extending from the pad contact surface to the cutting portion peripheral surface at opposite axial ends of the guide pad and two opposing pad side surfaces extending from the pad contact surface to the cutting portion peripheral surface at opposite rotational sides of the guide pad.

The two pad end surfaces and two pad side surfaces can all be sloped with respect to a pad projection axis along which each guide pad projects from the cutting portion peripheral surface.

The pad contact surface can be back-tapered.

The pad contact surface can have a parallelogram basic shape.

In a side view of the cutting tool part, the pad contact surface has a pad contact length measured in a direction of the pad longitudinal axis and a pad contact width measured in a direction perpendicular to the pad contact length. The pad contact width can be less than half the pad contact length.

The pad contact width can be less than quarter the pad contact length.

The pad contact width can be less than 4 mm.

In a side view of the cutting tool part, the pad contact surface has a pad contact axial height measured in a direction of the tool part longitudinal axis. The pad contact surface can be spaced apart from the tool part forward end surface by a pad distance. The pad distance can be greater than the pad contact axial height.

The cutting tool part can comprise a cutting edge integrally formed with the cutting portion.

Alternatively, the cutting tool part can comprise an insert pocket.

The insert pocket may be devoid of a threaded screw hole configured to receive a clamping screw for retaining a cutting insert.

The cutting insert can comprise a cutting insert material. The cutting insert material can be different from the cutting portion material and/or the guide pad material. The cutting insert material can be harder than the cutting portion material and/or the guide pad material.

The step of the plurality of guide pads can be performed during the step of manufacturing the cutting portion.

The method can further comprise the step of manufacturing, by using a third additive manufacturing process, the shank portion.

The method can further comprise the step of applying a coating layer to at least the plurality of guide pads.

The method can further comprise the step of applying a low temperature PVD coating layer to at least the plurality of guide pads.

BRIEF DESCRIPTION OF THE FIGURES

For a better understanding of the present application and to show how the same may be carried out in practice, reference will now be made to the accompanying drawings, in which.

Figures 1, 2:
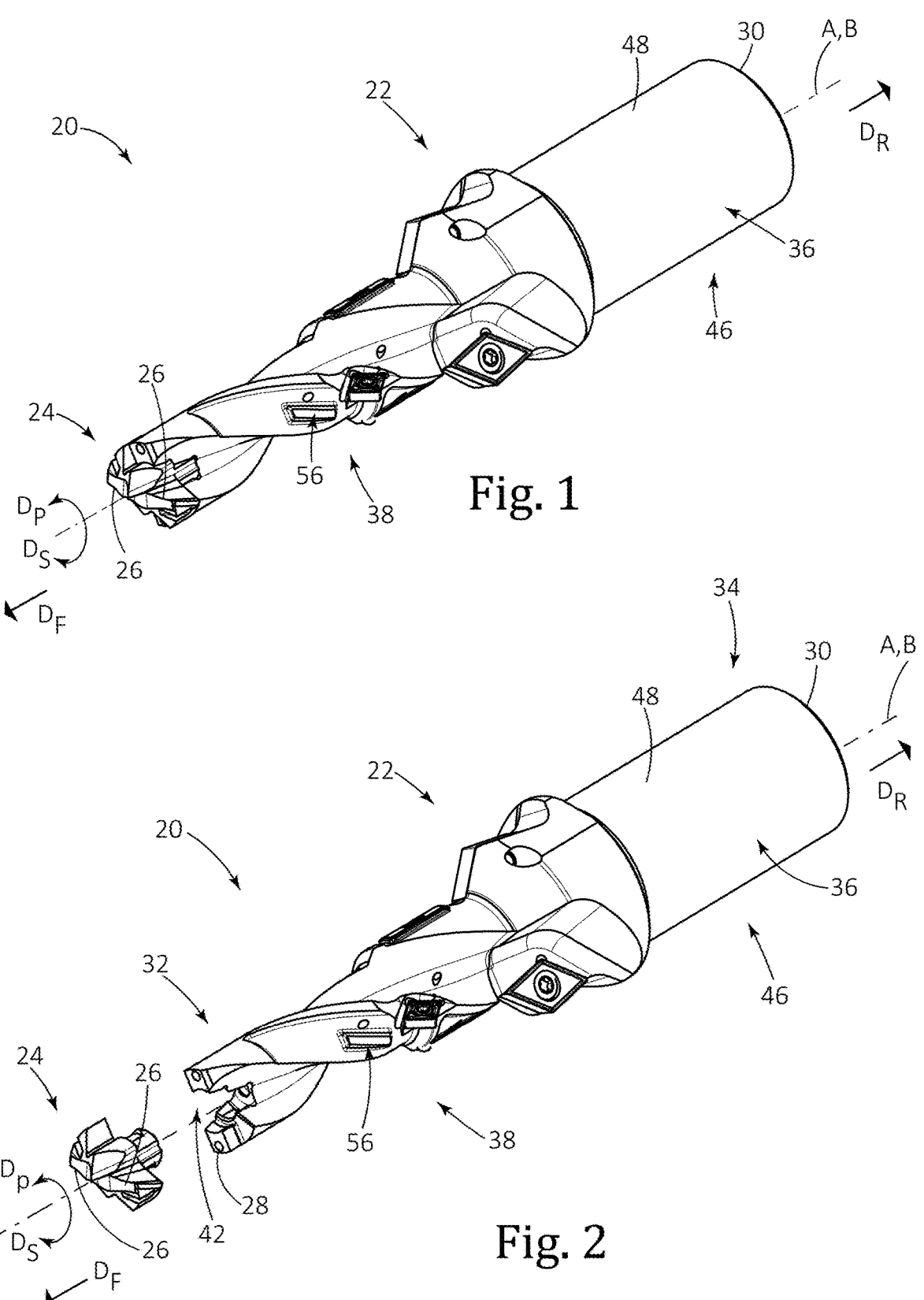
FIG. 1 is a perspective view of a rotary cutting tool, in accordance with the present application.
FIG. 2 is an exploded view of the rotary cutting tool in FIG. 1.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIG. 1 showing a rotary cutting tool 20, for chip removal, depicting an aspect of the present application. The cutting tool 20 has a tool longitudinal axis A. The cutting tool 20 is elongated along the tool longitudinal axis A. The cutting tool 20 is a rotary cutting tool. That is to say, the cutting tool 20 is designed to rotate about a rotational axis (i.e., the tool longitudinal axis A). In the non-limiting example shown in the drawings, the cutting tool 20 is a drilling tool. However, the subject matter of the present application is not restricted only to drilling tools and could also be applicable to, for example but not limited to, reaming tools.

The cutting tool 20 includes a cutting tool part 22, which is described in detail further on in the description. In accordance with some embodiments of the subject matter of the present application, the cutting tool 20 can also include a cutting insert 24. The cutting insert 24 can be made through typical methods, such as pressing and sintering. The cutting insert 24 includes a cutting insert material. The cutting insert 24 has a cutting edge 26 designed to perform metal cutting operations. The cutting insert 24 can be releasably attached to the cutting tool part 22. The cutting insert 24 may be a self-clamping cutting insert which is devoid of a through bore configured to receive a clamping screw to secure the cutting insert in an insert pocket. In accordance with some other embodiments of the subject matter of the present application, the cutting edge 26 can be integrally formed with the cutting portion 38.

Reference is now made to FIG. 2, showing the cutting tool part 22, depicting another aspect of the present application. The cutting tool part 22 has a tool part longitudinal axis B, that defines opposite forward and rear directions $D_F$, $D_R$. The cutting tool part 22 is elongated along the tool part longitudinal axis B. The cutting tool part 22 is configured to rotate about the tool part longitudinal axis B. The tool part central axis B also defines rotational preceding and succeeding directions $D_P$, $D_S$. The preceding direction $D_P$ is the cutting direction of the cutting tool part 22. In accordance with some embodiments of the subject matter of the present application, the cutting tool 20 and the cutting tool part 22 can be co-axial with each other. It should be noted that two elements (e.g., the cutting tool 20 and the cutting tool part 22 in the present case) are co-axial with each other when their longitudinal axes are co-incident (aligned with each other).

Figure 4:
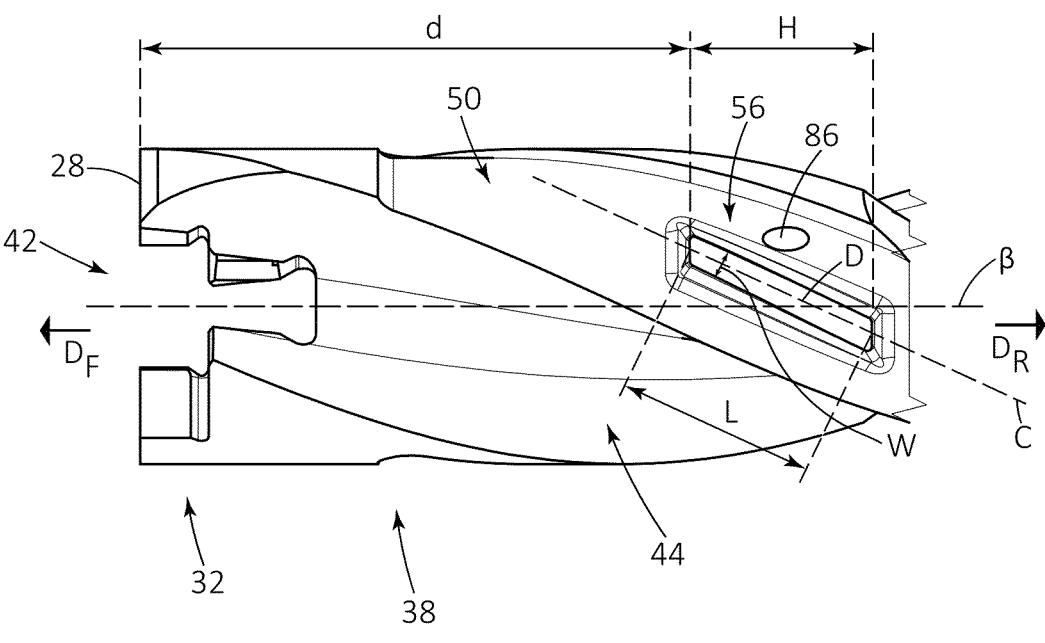
FIG. 4 is a side view of a cutting portion of the cutting tool part in FIG. 3.
Figure 4A:
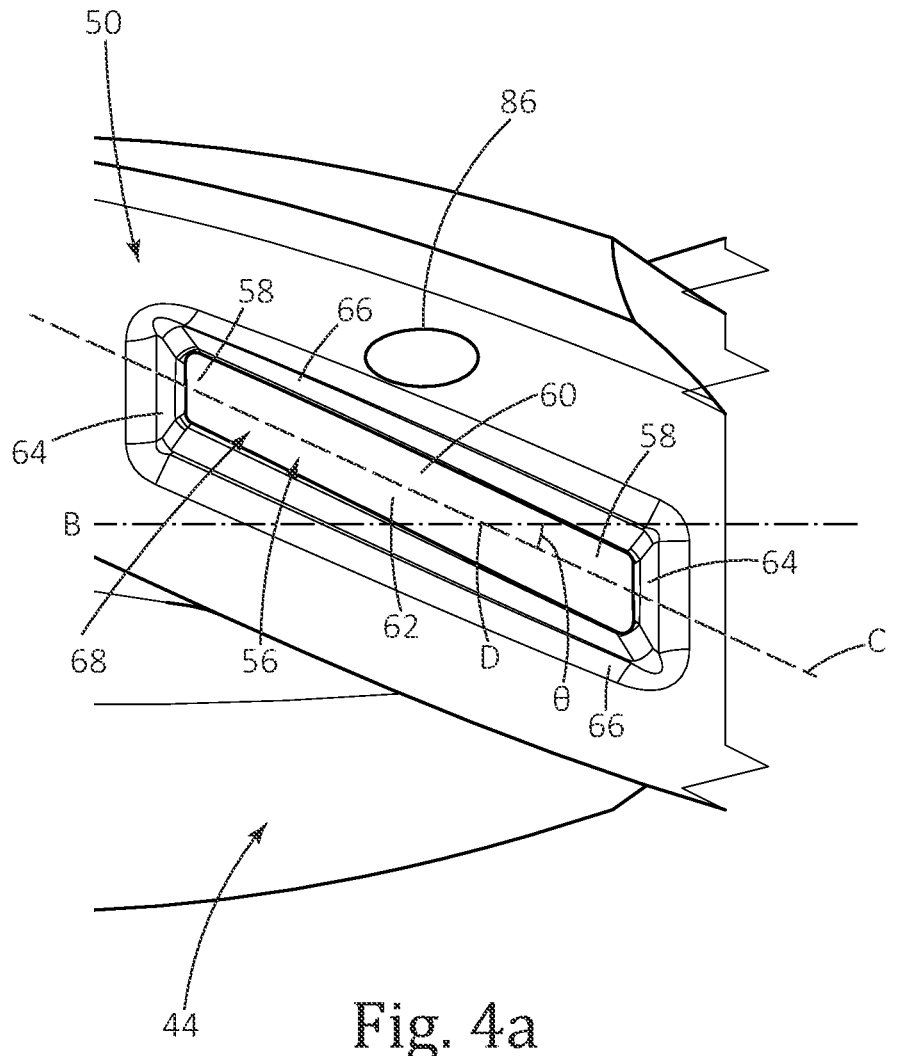
FIG. 4a is a detail of FIG. 4.
Figure 5:
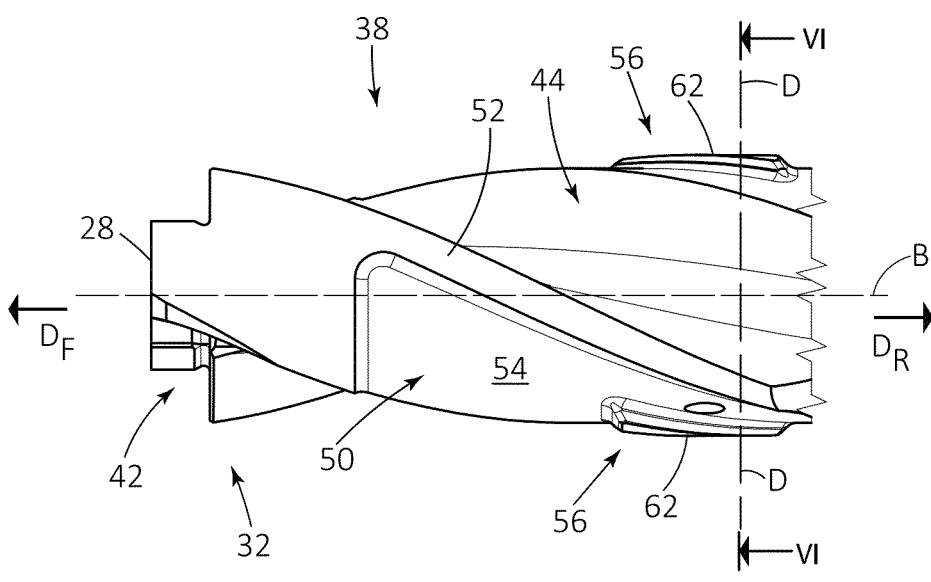
FIG. 5 is an analogous view of FIG. 4, with the cutting portion rotated 90° about a tool part longitudinal axis.

It should further be noted that use of the terms "forward" and "rearward" throughout the description and claims refer to a relative position in a direction of the tool part longitudinal axis B to the left and to the right, respectively, in FIGS. 4, 4a and 5. Generally speaking, the forward direction is the direction towards the cutting edge 26.

Referring to FIGS. 1 to 2, the cutting tool part 22 includes a tool part forward end surface 28 and a tool part rearward end surface 30 opposite the tool part forward end surface 28. The tool part forward end surface 28 is located at a forward end 32 of the cutting tool part 22. The tool part rearward end surface 30 is located at a rearward end 34 of the cutting tool part 22. The tool part rearward surface 30 can be planar. The tool part forward and rearward surfaces 28, 30 can be intersected by the tool part longitudinal axis B. The cutting tool part 22 further includes a tool part peripheral surface 36 extending between the tool part forward end surface 28 and the tool part rearward end surface 30. The tool part peripheral surface 36 extends about the tool part longitudinal axis B.

Figure 3:
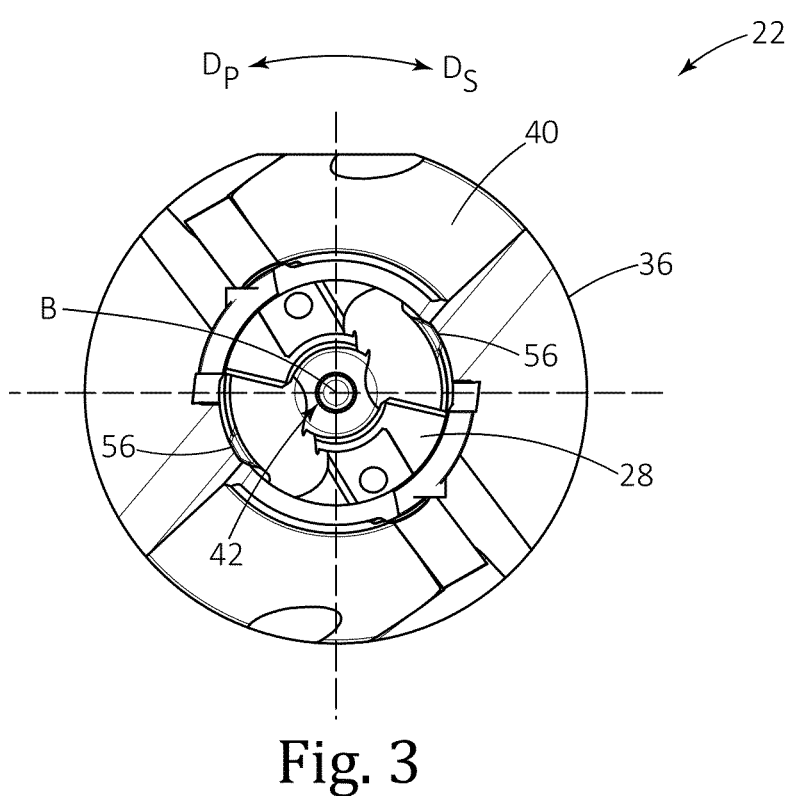
FIG. 3 is an end view of a cutting tool part in FIG. 1.

Reverting to FIGS. 2-4, the cutting tool part 22 includes an additively manufactured cutting portion 38. The cutting portion 38 is made through additive manufacturing and includes a cutting portion material. The cutting portion 38 is located at the forward end 32 of the cutting tool part 22. The cutting portion 38 includes a cutting portion peripheral surface 40 formed from the tool part peripheral surface 36. Stated differently, the tool part peripheral surface 36 at the cutting portion 38 forms a cutting portion peripheral surface 40. The cutting portion peripheral surface 40 is formed from a full circumferential (i.e., 360°) portion of the tool part peripheral surface 36. The cutting portion peripheral surface 40 intersects, and forms a boundary of, the tool part forward end surface 28. In accordance with some embodiments of the subject matter of the present application, the cutting portion 38 can include an insert pocket 42, for receiving the cutting insert 24. The insert pocket 42 can be located at the intersection of the tool part peripheral surface 36 and the tool part forward end surface 28. In an assembled position of the cutting tool 20, the cutting insert 24 can be releasably retained in the insert pocket 42. The insert pocket 24 may be devoid of a threaded hole configured to receive a clamping screw to secure a cutting insert therein, and thus may accommodate a self-clamping cutting insert.

It should be noted that use of the term "additively manufactured" throughout the description and claims refers to refers to a type of component formed using one or more additive manufacturing processes used to create a three-dimensional object in which layers of material are formed to create an object. Examples of such additive manufacturing processes include, but are not limited to, Selective Laser Melting (SLM), Selective Laser Sintering (SLS), Direct Metal Laser Sintering (DMLS), Fused Deposition Modeling (FDM) and 3D Printing. One skilled in the art can detect whether a given component is an additively manufactured component, prior to any post-processing (such as grinding), by the presence of layers visible on the material.

In accordance with some embodiments of the subject matter of the present application, the cutting portion 38 can include a plurality of angularly spaced apart flutes 44 recessed in the tool part peripheral surface 36. The plurality of flutes 44 can extend helically about the tool part longitudinal axis B.

In accordance with some embodiments of the subject matter of the present application the cutting portion 38 can include a plurality of angularly spaced apart lands 50. The plurality of lands 50 can alternate with the plurality of flutes 44 about the tool part longitudinal axis B.

Figure 6:
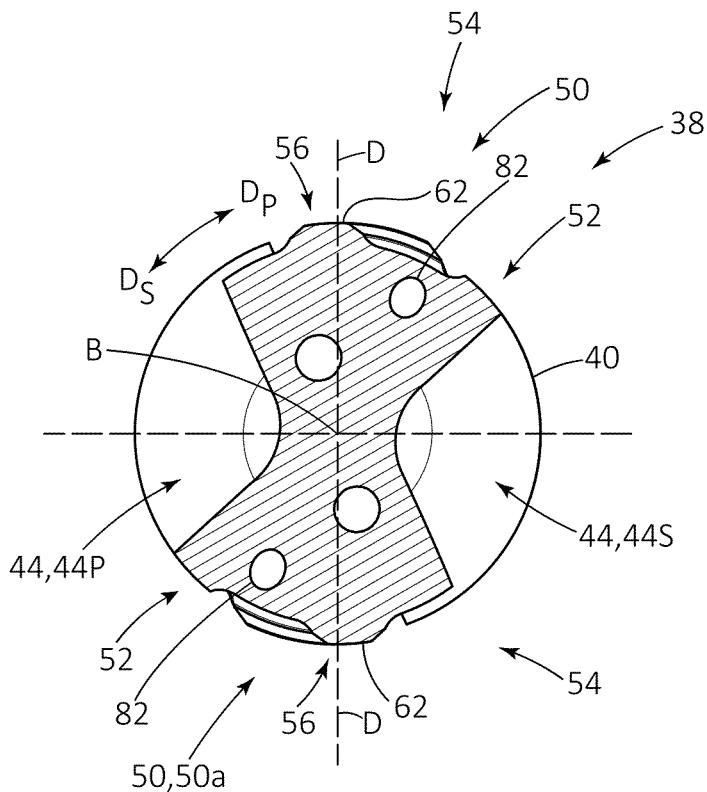
FIG. 6 is a radial cross-sectional view of the cutting portion taken along line VI-VI in FIG. 5.

Referring to FIG. 6, in accordance with some embodiments of the subject matter of the present application, each land 50 can extend between a pair of angularly adjacent associated flutes 44. The pair of angularly adjacent associated flutes 44 include an associated rotationally preceding flute 44P which adjoins the land 50 in the rotationally preceding direction $D_P$ and an associated rotationally succeeding flute 44S which adjoins the land 50 in the rotationally succeeding direction $D_S$. Thus, for each land 50, the associated rotationally preceding flute 44P is rotationally forward of the associated rotationally succeeding flute 44S. It is noted that a flute can be rotationally preceding flute 44P for one land 50 and a rotationally succeeding flute 44S for another flute 50.

Making reference to FIG. 5, in accordance with some embodiments of the subject matter of the present application, each land 50 can be delimited in the radially outwards direction by the cutting portion peripheral surface 40. The cutting portion peripheral surface 40 at each land 50 can include a land raised surface 52 which extends along the associated rotationally preceding flute 44P. Each land 50 can include a land clearance surface 54 which is recessed in the radially inwards direction with respect to the land raised surface 52. The land clearance surface 54 can extend from the land raised surface 52 to the associated rotationally succeeding flute 44S. The land clearance surface 54 can be spaced apart from the tool part forward end surface 28.

Reverting to FIGS. 1 and 2, the cutting tool part 22 includes a shank portion 46 which extends rearwardly from the cutting portion 38. The shank portion 46 includes a means to attach the cutting tool part 22 to a tool holder (not shown). Specifically, the shank portion 46 is configured to be located in a tool receiving recess of the tool holder and releasably clamped therein. Referring to FIGS. 4 and 5*a*-5*b*, the tool part peripheral surface 36 at the shank portion 46 forms a shank radial centering surface 48. The shank radial centering surface 48 serves to ensure precise radial alignment of the cutting tool part 22 in the tool holder. In accordance with some embodiments of the subject matter of the present application, the shank radial centering surface 48 can be cylindrical or conical about the tool part longitudinal axis B. Preferably, the shank radial centering surface 48 can be cylindrical about the tool part longitudinal axis B. The shank portion 46 can be made through additive manufacturing.

The cutting tool part 22 includes a plurality of additively manufactured guide pads 56. The plurality of guide pads 56 project from the cutting portion peripheral surface 40. The plurality of guide pads 56 are made through additive manufacturing and include a guide pad material. The plurality of guide pads 56 are integrally formed with the cutting portion 38 in a unitary one-piece construction. As used herein, an item is said to have "unitary one-piece construction" if it results from an additive manufacturing process, even if more than one material is used during the additive manufacture of that item.

In accordance with some embodiments of the subject matter of the present application, the plurality of guide pads 56 can extend helically about the tool part longitudinal axis B. A helical configuration provides improved guidance compared to straight pads, in particular if there are cross holes in the drilled hole. The plurality of guide pads 56 can extend helically about the tool part longitudinal axis B in the same sense as the plurality of helical flutes 44. Each helical guide pad 56 can have a pad helix angle θ. The pad helix angle θ can be greater than or equal to 20° and less than or equal to 40°.

In accordance with some embodiments of the subject matter of the present application, each land 50 can have a respective guide pad 56 formed thereon. In particular, each land 50 can have a single respective guide pad 56 formed thereon.

For any given land 50*a*, the respective guide pad 56 can be the radially outermost portion of the given land 50*a*. In particular, the respective guide pad 56 can project further radially outwards than the land raised surface 52 of the given land 50*a*. The respective guide pad 56 can be spaced apart from the given land's associated rotationally preceding flute 44P. The respective guide pad 56 can be spaced apart from the given land's associated rotationally succeeding flute 44S. The respective guide pad 56 can be formed on the given land's land clearance surface 54.

Referring to FIG. 4, in accordance with some embodiments of the subject matter of the present application, the guide pad 56 can be elongated along a pad longitudinal axis C. Each guide pad 56 can have two opposite pad ends 58 and an elongated pad middle portion 60 extending therebetween. One pad end 58 can be closer to the shank portion 46 than the other pad end 58. In the configuration having a plurality of helical guide pads 56, the pad longitudinal axis C can be an (imaginary) line tangent to the pad middle portion 60.

In accordance with some embodiments of the subject matter of the present application, each guide pad 56 can include a central radially outward facing pad contact surface

62. The pad contact surface 62 can be back-tapered. That is to say, each pad contact surface 62 can taper inwardly towards the cutting part longitudinal axis B in the rearward direction $D_R$. The pad contact surface 62 can have a parallelogram basic shape, having a short diagonal and a long diagonal. Each guide pad 56 can include two opposing pad end surfaces 64 extending from the pad contact surface 62 to the cutting portion peripheral surface 40 at opposite axial ends of the guide pad 56. Each guide pad 56 can include two opposing pad side surfaces 66 extending from the pad contact surface 62 to the cutting portion peripheral surface 40 at opposite rotational sides of the guide pad 56. The two pad side surfaces 66 can connect the two opposing pad end surfaces 64. The two pad end surface 64 and two pad side surfaces 66 can all be sloped with respect to a pad projection axis D along which each guide pad 56 projects from the cutting portion peripheral surface 40. Thus, each guide pad 56 can merge smoothly with the cutting portion 38. Referring to FIGS. 4 to 6, the pad projection axis D can be contained in a radial plane oriented perpendicular to the tool part longitudinal axis B and intersecting the tool part longitudinal axis B and the pad longitudinal axis C.

In accordance with some embodiments of the subject matter of the present application, in a side view of the cutting tool part 22, the pad contact surface 62 has a pad contact length L measured in a direction of the pad longitudinal axis C and a pad contact width W measured in a direction perpendicular to pad contact length L. The pad contact width W can be less than half the pad contact length L. In particular, the pad contact width W can be less than quarter the pad contact length L. The pad contact width W can be less than 4 mm. The pad contact width W can be less than 2 mm. Making the guide pad with such small dimensions allows for placement of the guide pads on the drill lands, while both providing adequate support against the cylindrical walls of the hole being drilled and minimizing the amount of friction with those walls.

Referring to FIG. 4, in accordance with some embodiments of the subject matter of the present application, in a side view of the cutting tool part 22, the pad contact surface 62 can have a pad contact axial height H measured in a direction of the tool part longitudinal axis B. The pad contact surface 62 can be spaced apart from the tool part forward end surface 28 by a pad distance d (as measured in the same direction). The pad distance d can be greater than the pad contact axial height H. The pad distance d can be greater than twice the pad contact axial height H.

In accordance with some embodiments of the subject matter of the present application, the cutting portion material and the guide pad material can be the same. In the configuration having the cutting edge 26 integrally formed with the cutting portion 38, the cutting portion material and the guide pad material can both be cemented carbide or cermet. In the configuration having a cutting insert, having a cutting edge, releasably retained in the insert pocket, the cutting portion material can be typically steel. The guide pad material may also be steel.

Alternatively, the cutting portion material and the guide pad material can be different. The cutting portion material may not be cemented carbide or cermet. For example, the cutting portion material may be steel. Similarly, the guide pad material also may not be cemented carbide or cermet. The guide pad material may be stellite, which has greater wear resistance than steel.

In accordance with some embodiments of the subject matter of the present application, the cutting insert material can be different from the cutting portion material. The cutting insert material can be harder than the cutting portion material. The cutting insert material can be different from the guide pad material. The cutting insert material is harder than the guide pad material.

In accordance with some embodiments of the subject matter of the present application, the cutting tool part 22 can include a coating layer 68 which can be formed on at least the plurality of guide pads 56. That is to say, the coating layer 68 can be applied to at least the guide pad material. The coating layer 68 serves to increase the wear resistance of the plurality of the guide pads 56, which is important when they are made from, for example, steel. The coating layer 68 can optionally be formed on the cutting portion 38 and/or the shank portion 46. The coating layer 68 can be a PVD coating layer. That is to say, the coating layer 68 can be deposited via a PVD process. The PVD coating layer can be a low temperature PVD coating layer. That is to say, the PVD coating layer can be deposited at a relatively low temperature. The low temperature PVD coating layer can be TiN.

Referring to FIG. 6, in accordance with some embodiments of the subject matter of the present application, the cutting tool part 22 can include a plurality of cooling channels 82. Each cooling channel 82 has a channel inlet (not shown) and a channel outlet 86 which are in fluid communication with each other. Each land 50 can have a respective channel outlet 86 formed thereon. The respective channel outlet 86 is configured to direct coolant to the respective guide pad 56, thereby increasing the wear resistance. The respective channel outlet 86 can be formed between the respective guide pad 56 and the given land's associated rotationally preceding flute 44P. The respective channel outlet 86 can be formed on the land clearance surface 54.

A third aspect of present invention relates to a method of manufacture of the cutting tool part 22 describe above. The method includes the step of manufacturing, by using a first additive manufacturing process, the cutting portion 38. The method further includes the step of manufacturing, by using a second additive manufacturing process, the plurality of guide pads 56, during or after the step of manufacturing the cutting portion 38. Preferably, the foregoing step is performed during (i.e., at the same time as) the step of manufacturing the cutting portion 38, in which case the first and second additive manufacturing processes are performed concurrently. In accordance with some embodiments of the subject matter of the present application, the method can further include the step of manufacturing the shank portion 46 by using a third additive manufacturing process. Thus, the entire cutting tool part 22 can be made through additive manufacturing and can have a unitary one-piece construction, even though a plurality of additive manufacturing processes are employed. The method can further include the step of grinding the plurality of guide pads 56 so that the pad contact surface 62 is back-tapered. The method can further include the step of applying a coating layer to at least the plurality of guide pads 56. The step of applying a coating layer to at least the plurality of guide pads 56 can include applying the coating layer to the entire cutting portion 38.

It should be noted that guide pads 56 described hereinabove are not limited in size by a need for a though hole (for receiving the retaining screw) as is the case for typical releasable guide pads.

It should also be noted that cutting portions 38 having guide pads 56 described hereinabove can smoothly transition with the cutting portion 38, unlike releasable guide pads which require a recessed pad pocket in the cutting portion.

Any gaps between the guide pads and the pad pocket can trap small chips, which can damage the surface finish of the drilled hole.

Although the subject matter of the present application has been described to a certain degree of particularity, it should be understood that various alterations and modifications could be made without departing from the spirit or scope of the invention as hereinafter claimed.

What is claimed is:

1. A cutting tool part (22), configured for rotation about a tool part longitudinal axis (B), the cutting tool part (22) having a forward direction (D$_F$) and a rearward direction (D$_R$), opposite the forward direction (D$_F$), that extend in directions parallel to the tool part longitudinal axis (B), the cutting tool part (22) having a rotational preceding direction (D$_P$) about the tool part longitudinal axis (B) that corresponds with the cutting direction and a rotational succeeding direction (D$_S$) about the tool part longitudinal axis (B) that is opposite the rotational preceding direction (D$_P$), the cutting tool part (22) comprising:

a tool part forward end surface (28), a tool part rearward end surface (30) and a tool part peripheral surface (36) extending therebetween, the tool part peripheral surface (36) extending about the tool part longitudinal axis (B);

an additively manufactured cutting portion (38) comprising a cutting portion material and located at a forward end (32) of the cutting tool part (22), the cutting portion (38) comprising a cutting portion peripheral surface (40) formed from the tool part peripheral surface (36);

a shank portion (46) extending rearwardly from the cutting portion (38);

a plurality of additively manufactured guide pads (56), each guide pad comprising a guide pad material and projecting from the cutting portion peripheral surface (40), each guide pad (56) comprising:

a central radially outward facing pad contact surface (62);

pad end surfaces (64) extending from the pad contact surface (62) to the cutting portion peripheral surface (40) at opposite axial ends of the guide pad (56), the pad contact surface (62) having a pad contact axial height (H) measured in a direction of the tool part longitudinal axis (B) between the pad end surfaces (64), the guide pad (56) spaced apart from the tool part forward end surface (28) by a pad distance (d) that is greater than the pad contact axial height (H); and an insert pocket (42);

wherein:

the plurality of guide pads (56) are integrally formed with the cutting portion in a unitary monolithic construction.

2. The cutting tool part (22), according to claim 1, wherein the cutting portion material and the guide pad material are the same.

3. The cutting tool part (22), according to claim 1, wherein the cutting portion material and the guide pad material are different.

4. The cutting tool part (22), according to claim 1, wherein the cutting portion material and/or the guide pad material is not cemented carbide or cermet.

5. The cutting tool part (22), according to claim 1, wherein the guide pad material is steel.

6. The cutting tool part (22), according to claim 1, further comprises a coating layer (68) formed on at least the plurality of guide pads (56).

7. The cutting tool part (22), according to claim 6, wherein the coating layer (68) is a PVD coating layer.

8. The cutting tool part (22), according to claim 7, wherein the PVD coating layer is a low temperature PVD coating layer.

9. The cutting tool part (22), according to claim 8, wherein the low temperature PVD coating layer is TiN.

10. The cutting tool part (22), according to claim 1, wherein the plurality of guide pads (56) extend helically about the tool part longitudinal axis (B).

11. The cutting tool part (22), according to claim 10, wherein:

the cutting portion (38) comprises a plurality of angularly spaced apart flutes (44) recessed in the cutting portion peripheral surface (40); and the plurality of guide pads (56) extend helically about the tool part longitudinal axis (B) in the same sense as the plurality of angularly spaced apart, helically-extending flutes (44).

12. The cutting tool part (22), according to claim 10, wherein each helical guide pad (56) has a pad helix angle (θ), the pad helix angle (θ) being greater than or equal to 20° and less than or equal to 40°.

13. The cutting tool part (22), according to claim 1, wherein each guide pad (56) is elongated along a pad longitudinal axis (C) and has two opposite pad ends (58) and an elongated pad middle portion (60) extending therebetween.

14. The cutting tool part (22), according to claim 13, wherein one pad end (58) is closer to the shank portion (46) than the other pad end (58).

15. The cutting tool part (22), according to claim 1, wherein each guide pad (56) further comprises:

two opposing pad side surfaces (66) extending from the pad contact surface (62) to the cutting portion peripheral surface (40) at opposite rotational sides of the guide pad (56).

16. The cutting tool part (22), according to claim 15, wherein the two pad end surfaces (64) and two pad side surfaces (66) are all sloped with respect to a pad projection axis (D) along which each guide pad (56) projects from the cutting portion peripheral surface (40).

17. The cutting tool part (22), according to claim 15, wherein the pad contact surface (62) is back-tapered.

18. The cutting tool part (22), according to claim 15, wherein the pad contact surface (62) has a parallelogram basic shape.

19. The cutting tool part (22), according to claim 15, wherein in a side view of the cutting tool part (22):

the pad contact surface (62) has a pad contact length (L) measured in a direction of the pad longitudinal axis (C) and a pad contact width (W) measured in a direction perpendicular to the pad contact length (L); and the pad contact width (W) is less than half the pad contact length (L).

20. The cutting tool part (22), according to claim 19, wherein the pad contact width (W) is less than quarter the pad contact length (L).

21. The cutting tool part (22), according to claim 20, wherein the pad contact width (W) is less than 4 mm.

22. The cutting tool part (22), according to claim 1, comprising a cutting edge (26) integrally formed with the cutting portion (38).

23. A rotary cutting tool (20), comprising: a cutting tool part (22) according to claim 1; and a cutting insert (24), having a cutting edge (26), releasably retained in the insert pocket (42).

24. The cutting tool (20), according to claim 23, wherein:

the cutting insert (24) comprises a cutting insert material; and the cutting insert material is different from the cutting portion material and/or the guide pad material, the cutting insert material being harder than the cutting portion material and/or the guide pad material.

25. A method of manufacturing the cutting tool part (22) of claim 1, comprising the steps of:

manufacturing, by using a first additive manufacturing process, the cutting portion (38); and manufacturing, by using a second additive manufacturing process, the plurality of guide pads (56), during or after the step of manufacturing the cutting portion (38).

26. The method according to claim 25; wherein the step of manufacturing the plurality of guide pads (56) is performed during the step of manufacturing the cutting portion (38).

27. The method according to claim 25, further comprising the step of:

manufacturing, by using a third additive manufacturing process, the shank portion (46).

28. The method according to claim 25, further comprising the step of:

applying a coating layer (68) to at least the plurality of guide pads (56).

29. The method according to claim 25, further comprising the steps of applying a low temperature PVD coating layer to at least the plurality of guide pads (56).

30. A cutting tool part (22), configured for rotation about a tool part longitudinal axis (B), the cutting tool part (22) having a forward direction ($D_F$) and a rearward direction ($D_R$), opposite the forward direction ($D_F$), that extend in directions parallel to the tool part longitudinal axis (B), the cutting tool part (22) having a rotational preceding direction ($D_P$) about the tool part longitudinal axis (B) that corresponds with the cutting direction and a rotational succeeding direction ($D_S$) about the tool part longitudinal axis (B) that is opposite the rotational preceding direction ($D_P$), the cutting tool part (22) comprising:

a tool part forward end surface (28), a tool part rearward end surface (30) and a tool part peripheral surface (36) extending therebetween, the tool part peripheral surface (36) extending about the tool part longitudinal axis (B);

an additively manufactured cutting portion (38) comprising a cutting portion material and located at a forward end (32) of the cutting tool part (22), the cutting portion (38) comprising a cutting portion peripheral surface (40) formed from the tool part peripheral surface (36);

a shank portion (46) extending rearwardly from the cutting portion (38); and a plurality of additively manufactured guide pads (56), each guide pad comprising a guide pad material and projecting from the cutting portion peripheral surface (40), each guide pad (56) comprising:

a central radially outward facing pad contact surface (62);

pad end surfaces (64) extending from the pad contact surface (62) to the cutting portion peripheral surface (40) at opposite axial ends of the guide pad (56), the pad contact surface (62) having a pad contact axial height (H) measured in a direction of the tool part longitudinal axis (B) between the pad end surfaces (64), the guide pad (56) spaced apart from the tool part forward end surface (28) by a pad distance (d) that is greater than the pad contact axial height (H);

wherein:

the plurality of guide pads (56) are integrally formed with the cutting portion in a unitary monolithic construction, and wherein the cutting portion (38) comprises:

a plurality of angularly spaced apart flutes (44) recessed in the cutting portion peripheral surface (40); and a plurality of angularly spaced apart lands (50), each land (50) extending between an associated rotationally preceding flute (44P) and an associated rotationally succeeding flute (44S), the associated rotationally preceding flute (44) being rotationally forward of the associated rotationally succeeding flute (44S); wherein:

each land (50) has a respective guide pad (56) formed thereon; and for any given land (50a), the respective guide pad (56) is spaced apart from the given land's associated rotationally preceding flute (44P).

31. The cutting tool part (22), according to claim 30, wherein the respective guide pad (56) is spaced apart from the given land's associated rotationally succeeding flute (44S).

32. The cutting tool part (22), according to claim 30, wherein each land (50) has a single respective guide pad (56) formed thereon.

33. The cutting tool part (22), according to claim 30, wherein:

the cutting portion peripheral surface (40) at each land (50) comprises:

a land raised surface (52) extending along the associated rotationally preceding flute (44P); and a land clearance surface (54) recessed with respect to the land raised surface (52) and extending from the land raised surface (52) to the associated rotationally succeeding flute (44S); and the respective guide pad (56) is formed on the given land's land clearance surface (54).

34. The cutting tool part (22), according to claim 30, wherein:

the cutting tool part (22) comprises a plurality of cooling channels (82), each cooling channel (82) having a channel outlet (86); and each land (50) has a respective channel outlet (86) formed thereon, the respective channel outlet (86) being configured to direct coolant to the respective guide pad (56).

35. The cutting tool part (22), according to claim 34, wherein:

the respective channel outlet (86) is formed between the respective guide pad (56) and the given land's associated rotationally preceding flute (44P).

36. A cutting tool part (22), configured for rotation about a tool part longitudinal axis (B), the cutting tool part (22) having a forward direction ($D_F$) and a rearward direction ($D_R$), opposite the forward direction ($D_F$), that extend in directions parallel to the tool part longitudinal axis (B), the cutting tool part (22) having a rotational preceding direction ($D_P$) about the tool part longitudinal axis (B) that corresponds with the cutting direction and a rotational succeeding direction ($D_S$) about the tool part longitudinal axis (B) that is opposite the rotational preceding direction ($D_P$), the cutting tool part (22) comprising:

a tool part forward end surface (28), a tool part rearward end surface (30) and a tool part peripheral surface (36) extending therebetween, the tool part peripheral surface (36) extending about the tool part longitudinal axis (B);

an additively manufactured cutting portion (38) comprising a cutting portion material and located at a forward end (32) of the cutting tool part (22), the cutting portion (38) comprising a cutting portion peripheral surface (40) formed from the tool part peripheral surface (36);

a shank portion (46) extending rearwardly from the cutting portion (38);

a plurality of angularly spaced apart flutes (44) recessed in the cutting portion peripheral surface (40);

a plurality of guide pads (56) integrally formed with the cutting portion in a unitary monolithic construction;

a plurality of angularly spaced apart lands (50), each land (50) extending between an associated rotationally preceding flute (44P) and an associated rotationally succeeding flute (44S) of the plurality of angularly spaced apart flutes (44), the associated rotationally preceding flute (44) being rotationally forward of the associated rotationally succeeding flute (44S), each land (50) having a respective guide pad (56) formed thereon spaced apart from the associated rotationally preceding flute (44P); each guide pad comprising a guide pad material projecting from the land (50); and a coating layer (68) formed on the plurality of guide pads (56), the coating layer (68) is a PVD coating layer.

* * * * *